(12) United States Patent
Nishikawa

(10) Patent No.: US 11,949,743 B2
(45) Date of Patent: Apr. 2, 2024

(54) INFORMATION PROCESSING APPARATUS, CONTROL METHOD OF INFORMATION PROCESSING APPARATUS, AND RECORDING MEDIUM

(71) Applicant: CANON KABUSHIKI KAISHA, Tokyo (JP)

(72) Inventor: Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/944,795

(22) Filed: Sep. 14, 2022

(65) Prior Publication Data

US 2023/0098460 A1 Mar. 30, 2023

(30) Foreign Application Priority Data

Sep. 27, 2021 (JP) ................................ 2021-157286

(51) Int. Cl.
*H04L 67/125* (2022.01)
*G06F 1/3203* (2019.01)
*H04L 41/0213* (2022.01)

(52) U.S. Cl.
CPC .......... *H04L 67/125* (2013.01); *G06F 1/3203* (2013.01); *H04L 41/0213* (2013.01)

(58) Field of Classification Search
None
See application file for complete search history.

(56) References Cited

U.S. PATENT DOCUMENTS

| | | | |
|---|---|---|---|
| 6,701,327 B1 * | 3/2004 | Jones | C12N 15/102 |
| 2008/0098102 A1 * | 4/2008 | Vanover | H04L 67/125 |
| | | | 709/218 |
| 2009/0248867 A1 * | 10/2009 | Kishimoto | H04L 41/042 |
| | | | 709/224 |
| 2010/0079793 A1 | 4/2010 | Nishikawa | G06F 15/00 |
| 2010/0125683 A1 * | 5/2010 | Soeda | G06F 11/3466 |
| | | | 710/19 |
| 2010/0208294 A1 | 8/2010 | Nishikawa | G06F 3/12 |
| 2011/0276958 A1 | 11/2011 | Nishikawa | G06F 9/44 |
| 2013/0067044 A1 * | 3/2013 | Levy-Yurista | H04L 61/103 |
| | | | 709/220 |

(Continued)

FOREIGN PATENT DOCUMENTS

JP 2018-190001 11/2018

*Primary Examiner* — Jonathan A Bui
(74) *Attorney, Agent, or Firm* — Venable LLP

(57) ABSTRACT

A device management server that manages device information of a plurality of devices to be managed by a device information storage unit comprises: a device information management unit that manages the device information as a management target or as a non-management target by the device information storage unit; and a device display unit that performs a control such that, when selecting a device to which a first function is to be applied, a device corresponding to the device information managed as a management target is set to be a selection candidate instead of setting a device corresponding to the device information managed as a non-managed target to be a selection candidate, and when selecting a device to which a second function is to be applied, a device corresponding to the device information managed as a management target or non-management target is set to be a selection candidate.

8 Claims, 15 Drawing Sheets

(56) References Cited

U.S. PATENT DOCUMENTS

| | | | |
|---|---|---|---|
| 2013/0148155 A1* | 6/2013 | Kitagata | G06F 3/1203 |
| | | | 358/1.15 |
| 2014/0029038 A1* | 1/2014 | Bovenzi | G06Q 10/06 |
| | | | 358/1.14 |
| 2015/0205597 A1 | 7/2015 | Nishikawa | G06F 9/445 |
| 2019/0166012 A1* | 5/2019 | Nagai | G06F 3/04812 |

* cited by examiner

FIG. 8

| | Device | Setting | Power management | Security policy | | ✕ |
|---|---|---|---|---|---|---|
| | Select all | Cancel all | 804 — Display target: | | All ∨ | |
| | Device name | Host name | IP address | Serial No. | | |
| ☐ | Device 1 | host 21 | 192.168.10.87 | 18993354 | | |
| ☐ | Device 2 | host 31 | 192.168.10.100 | 18993344 | | |
| ☐ | Device 3 | host 44 | 192.168.10.110 | 18993343 | | |

802

803 — Next

| Power management schedule | | | ✕ |
|---|---|---|---|
| Operation type | Power off ∨ | ～902 | |
| Execution start time | 2021/07/01 22:00 | ～903 | |
| Repetition | Everyday | [+] ～904 | |
| Display target type | Non management ∨ | ～905 | ╭906 |

| Type | Execution time | Repetition | |
|---|---|---|---|
| Power off | 2021/06/01 23:00 | Everyday | − |

Save  Cancel

| | Device | Setting | Power management | Security policy | | ✕ |
|---|---|---|---|---|---|---|
| | Select all | Cancel all | 804 — Display target: | | All | |
| | Device name | Host name | IP address | | Management | |
| ☐ | Device 1 | host 21 | 192.168.10.87 | | Non management | |
| ☐ | Device 2 | host 31 | 192.168.10.100 | | 18993344 | |
| ☐ | Device 3 | host 44 | 192.168.10.110 | 18993343 | | |

802

803 — NEXT

| | Device | Setting | Power management | Security policy | ✕ |
|---|---|---|---|---|---|

| Select all | Cancel all | 804 ~ Display target: | All ⌄ |
|---|---|---|---|

| | Device name | Host name | IP address | Serial No. |
|---|---|---|---|---|
| ☐ | Device 3 | host 44 | 192.168.10.110 | 18993343 |

802

803 — NEXT

801

INFORMATION PROCESSING APPARATUS, CONTROL METHOD OF INFORMATION PROCESSING APPARATUS, AND RECORDING MEDIUM

BACKGROUND OF THE INVENTION

Field of the Invention

The present invention relates to an information processing apparatus that manage devices, a control method for an information processing apparatus, and a recording medium.

Description of the Related Art

Conventionally, device management systems and management servers that acquire and manage data such as operating information of devices such as printers and MFPs are known. In terms of the increase in the number of devices to be managed and the cost reduction and maintenance of the management server, the number of devices that can be managed by a single management device is increasing. In general, device management systems periodically acquire power supply, status, counters, and the like and continuously perform devices management. Power management includes powering off and rebooting devices.

Additionally, in a device management system, although devices to be managed are added by search, certain devices can be set to be devices not to be managed by specifying their IP addresses. A device management system that enables appropriate data analysis even if device information and associated information do not exist because the devices are set to be devices not to be managed has been devised. Japanese Patent Laid-Open No. 2018-190001 discloses a device management system that records information regarding devices that have been excluded from management in the process, together with an expiration date indicating how long they will be handled as a device to be managed and collects aggregated data until the expiration date.

However, if specific devices are excluded from management in the device management system as in Japanese Patent Laid-Open No. 2018-190001, important items such as security policy and power management cannot also be managed.

SUMMARY OF THE INVENTION

The present invention provides a device management function that meets the demand for device administrators, even in a case in which a specific device is set to be excluded from management.

An information processing apparatus of the present invention is an information processing apparatus that manages device information of a plurality of devices to be managed in a storage comprising: at least one memory storing instructions; and one or more processors configured to execute the instructions, which when executed by the one or more processors, cause the information processing apparatus to: manage the device information as a management target or as a non-management target in the storage; and perform a control such that if a device to which a first function is to be applied is selected, a device corresponding to device information managed as a management target is set to be a selection candidate, instead of setting a device corresponding to device information managed as a non-management target to be a selection candidate, and if a device to which a second function is to be applied is selected, a device corresponding to device information managed as a management target and a non-management target is set to be a selection candidate.

Further features of the present invention will become apparent from the following description of exemplary embodiments with reference to the attached drawings.

BRIEF DESCRIPTION OF THE DRAWINGS

FIG. 8 illustrates an example of a device selection screen.

FIG. 9 illustrates an example of a power management schedule setting screen.

FIG. 12 illustrates an example of a screen for setting display of target.

FIG. 13 illustrates an example of a device that is excluded from management is displayed as a selection candidate.

DESCRIPTION OF THE EMBODIMENTS

First Embodiment

Figure 1:
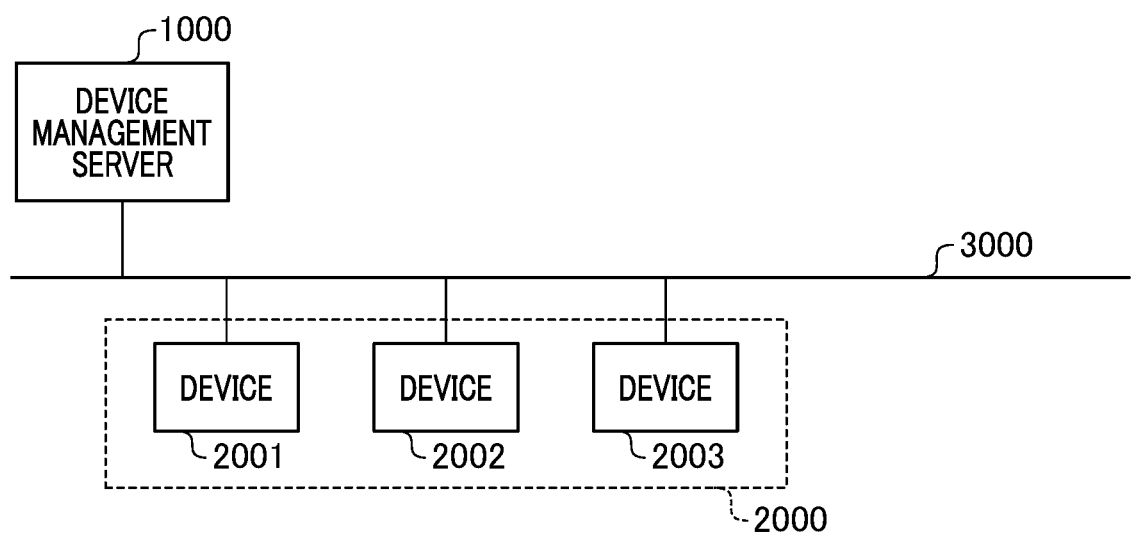
FIG. 1 illustrates a structure of a device management system.

FIG. 1 shows a structure of a device management system. The device management system has a device management server 1000 that manages devices and a device group 2000 to be managed. The device group 2000 includes a plurality of devices 2001 to 2003. The device management server 1000 is connected to each of the devices 2001 to 2003 via network 3000 and can communicate with each other.

Each of the devices 2001 to 2003 is an information processing apparatus capable of communicating with the device management server 1000. In the present embodiment, a case in which the devices 2001 to 2003 each have an MFP (Multi Function Peripheral) having multiple functions such as a printing function and a scanning function will be described, which is an example of the information processing apparatus. In printing, print data received from an external device is printed on actual paper by using known printing techniques such as the electrophotographic technique and the inkjet technique. In scanning, a paper document is read through a scanner to generate image data, which is then copied, converted into image data, and sent by email or other means. Note that the devices 2001 to 2003 may be any information processing apparatus that is communicable, for example, an image forming apparatus including a printer, an image processing apparatus including a scanner, a 3D printer, a notebook computer, a smartphone, and a smart home appliance.

The device management server 1000 is an information processing apparatus that provides a device management service by executing device management software. The device management server 1000 manages a plurality of devices of the device group 2000 through the network 3000. The device management server 1000 may be realized by a virtual machine (cloud service) using resources provided by a data center including an information processing apparatus, in addition to one or a plurality of information processing apparatuses, or a combination thereof.

The network 3000 is a communication network such as a LAN. Note that the network 3000 may comprise a communication network, for example, a LAN and WAN, a cellular network (for example, LTE or 5G), a wireless network, a telephone line, a dedicated digital line, or any combination thereof. That is, the network 3000 need only be configured to send and receive data, and any communication method may be used.

<Hardware Configuration of Device Management Server>

Figure 2:
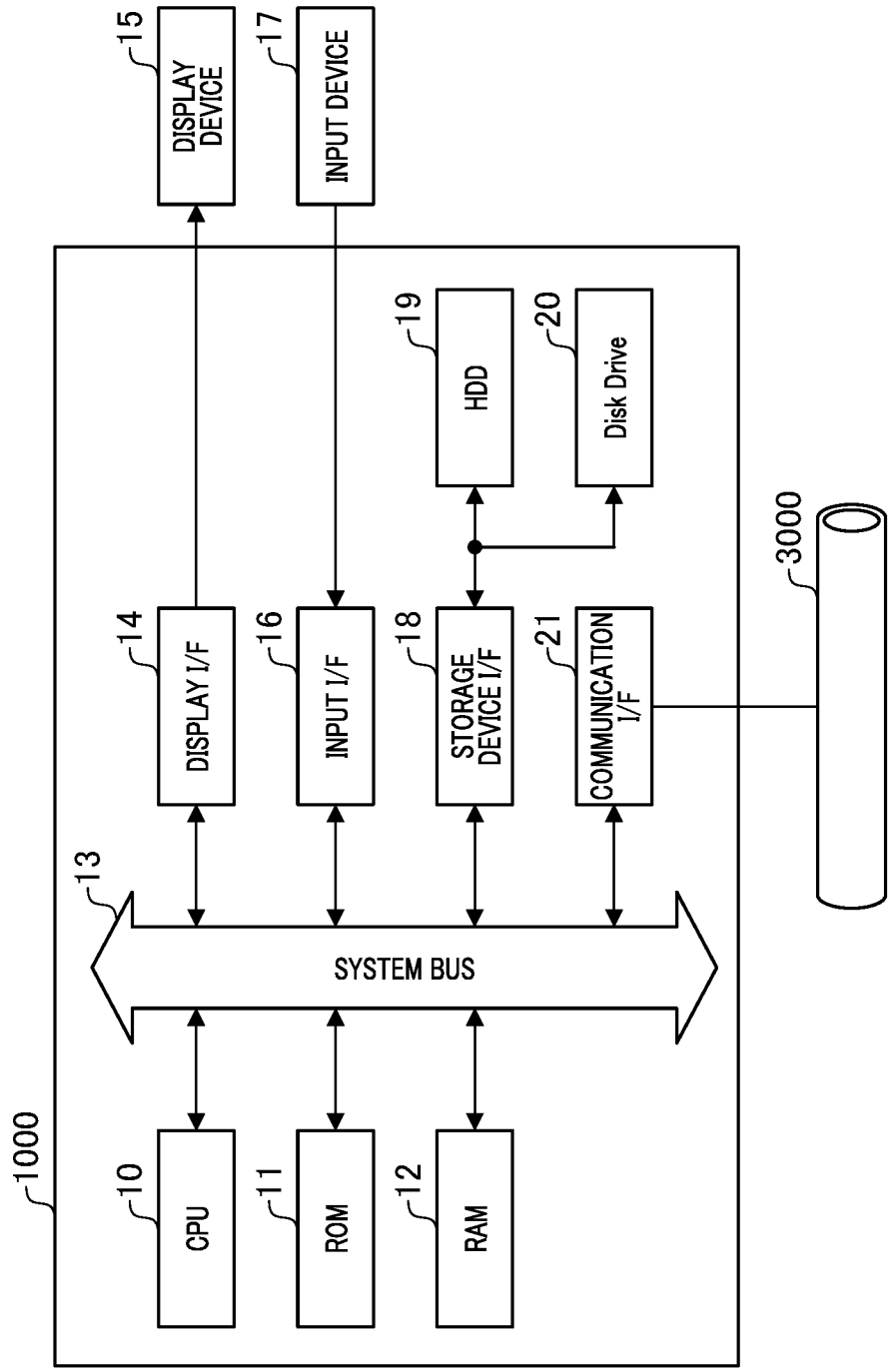
FIG. 2 illustrates a hardware configuration of a device management server.

FIG. 2 illustrates a hardware configuration of the device management server 1000. The device management server 1000 includes a CPU 10, a ROM 11, a RAM 12, a display I/F 14, a display device 15, an input I/F 16, an input device 17, a storage device I/F 18, an HDD 19, a disk drive 20, and a communication I/F 21. The CPU 10, the ROM 11, the RAM 12, the display I/F 14, the input I/F 16, the storage device I/F 18, and the communication I/F 21 are connected via a system bus 13.

The CPU (Central Processing Unit) 10 integrally controls the entire device management server 1000. The CPU 10 uses the RAM 12 as a work area to execute various programs such as device management software stored in the ROM 11 or the HDD 19 or supplied from a storage medium mountable on the disk drive 20.

The ROM (Read Only Memory) 11 is a memory dedicated to reading data, and stores, for example, a basic control program of the device management server 1000. The RAM (Random Access Memory) 12 is a memory capable of reading/writing data. The RAM 12 is used, for example, as a working memory of the CPU 10.

The display device 15 is, for example, a liquid crystal display and displays various kinds of information to a user. The CPU 10 displays the user interface and various screens on the display device 15 via the display I/F 14. The input device 17 has a pointing device (for example, a mouse, touchpad, a touch panel, and a trackball), a keyboard, and the like and receives an operation from a user. The CPU 10 receives an input instruction to the user interface from the input device 17 via the input I/F 16. The display device 15 and the input device 17 may be integrally formed by a touch panel and the like. It is possible to configure the GUI as if the user can directly operate the screen displayed on the touch panel by associating the input coordinates with the display coordinates on the touch panel.

The HDD (Hard Disk Drive) 19 is an example of a storage device and stores various programs, data, and the like. The disk drive 20 is an example of a storage device, and is a device capable of reading/writing data by loading external media such as an FD, a CD-ROM, a DVD, and an IC memory card. The CPU 10 accesses the HDD 19 and the disk drive 20 through the storage device I/F 18 to read data and write data. Additionally, the HDD 19 may be used instead of the RAM 13 or the ROM 12. The CPU 10 is connected to the network 3000 through the communication I/F 21 and enables data communication with the device 2001 on the network 3000.

<Software Configuration of Device Management Server>

Figure 3:
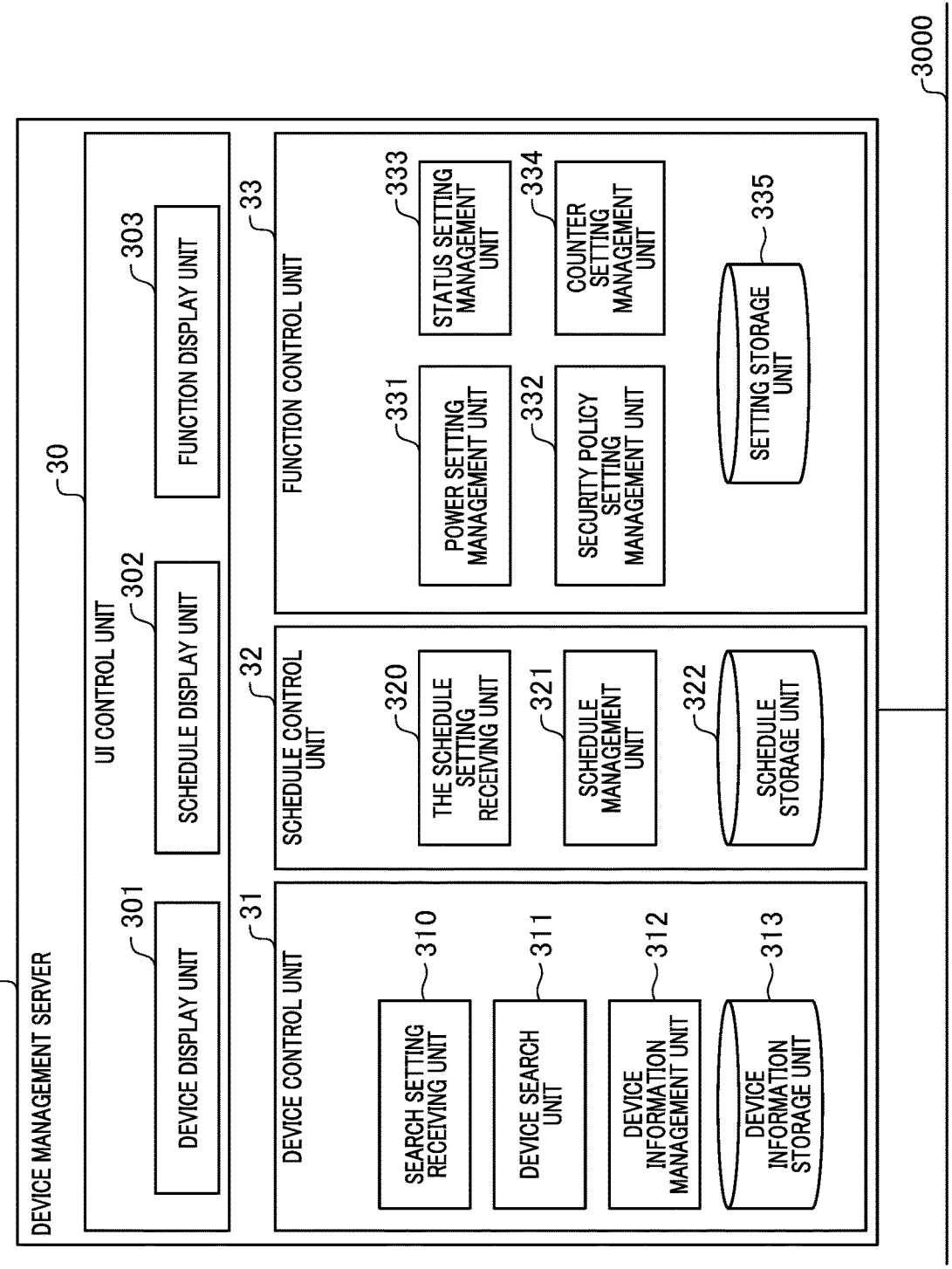
FIG. 3 illustrates a software configuration of the device management server.

FIG. 3 illustrates a module configuration of software related to device management of the device management server 1000. Each software module is realized by the CPU 10 invoking a program for device management stored in the ROM 11, the HDD 19, or the like to the RAM 12 and executing the program. The device management server 1000 includes a UI control unit 30, a device control unit 31, a schedule controlling unit 32, and a function control unit 33.

The UI control unit 30 has a device display unit 301, a schedule display unit 302, and a function display unit 303. The device display unit 301 controls UI display of the device control unit 31. The schedule display unit 302 controls UI display of the schedule control unit 32. The function display unit 303 controls UI display of the function control unit 33. Each UI may be displayed on the display device 15 of the device management server 1000 or may be provided on a web browser via the network 3000.

The device control unit 31 has a search setting receiving unit 310, a device search unit 311, a device information management unit 312, and a device information storage unit 313. The search setting receiving unit 310 receives a search range for finding a device to be managed and an exclusion from a search specified by a user in a search setting screen 600. For example, an IP address is used for specifying the search range or the exclusion from search. Additionally, in the present embodiment, a device having an IP address specified as the exclusion from search is managed as an exclusion from management. Therefore, in the present embodiment, an IP address specified as the exclusion from search is used as information for specifying a device that is excluded from search. The device search unit 311 searches for a device on the network according to the setting received by the search setting receiving unit 310. The device search is performed, for example, by SNMP, IP Broadcast, SLP/Multicast, and the like. The device search unit 311 acquires device information such as a device name, a product name, and an IP address from the searched device. The device search unit 311 has a function of acquiring/changing device information such as MIB (Management Information Base) security policy information. The device information management unit 312 manages the device information stored in the device information storage unit 313. The device information storage unit 313 functions as storage means (storage) for storing the device information.

The schedule control unit 32 has a schedule setting receiving unit 320, a schedule management unit 321, and a schedule storage unit 322. The schedule setting receiving unit 320 receives an input from a user on a schedule setting screen. The schedule management unit 321 generates each function (task) schedule in response to input from a user, and manages a schedule stored in the schedule storage unit 322. The schedule storage unit 322 stores the set schedule.

The function control unit 33 has a power setting management unit 331, a security policy setting management unit 332, a status setting management unit 333, a counter setting management unit 334, and a setting storage unit 335. The power setting management unit 331 performs power management for the device according to a schedule related to power management. The security policy setting management unit 332 performs security management for the device according to a schedule related to security. The status setting management unit 333 collects status information from the device and manages the state of the device. The counter setting management unit 334 collects counter information from the device and manages the state of the device and consumables. The setting storage unit 335 stores the information collected from the device. Additionally, the function control unit 33 communicates with the device 2000 on the network 3000 in order to manage the device by the power setting management unit 331, the security policy setting management unit 332, the status setting management unit 333, and the counter setting management unit 334. Here, the device information storage unit 313, the schedule storage unit 322, and the setting storage unit 335 are data recording media such as a database that operates on the HDD 19, and table data such as a schedule list, a device list, and a function list are stored therein.

<Software Configuration of Device>

Figure 4:
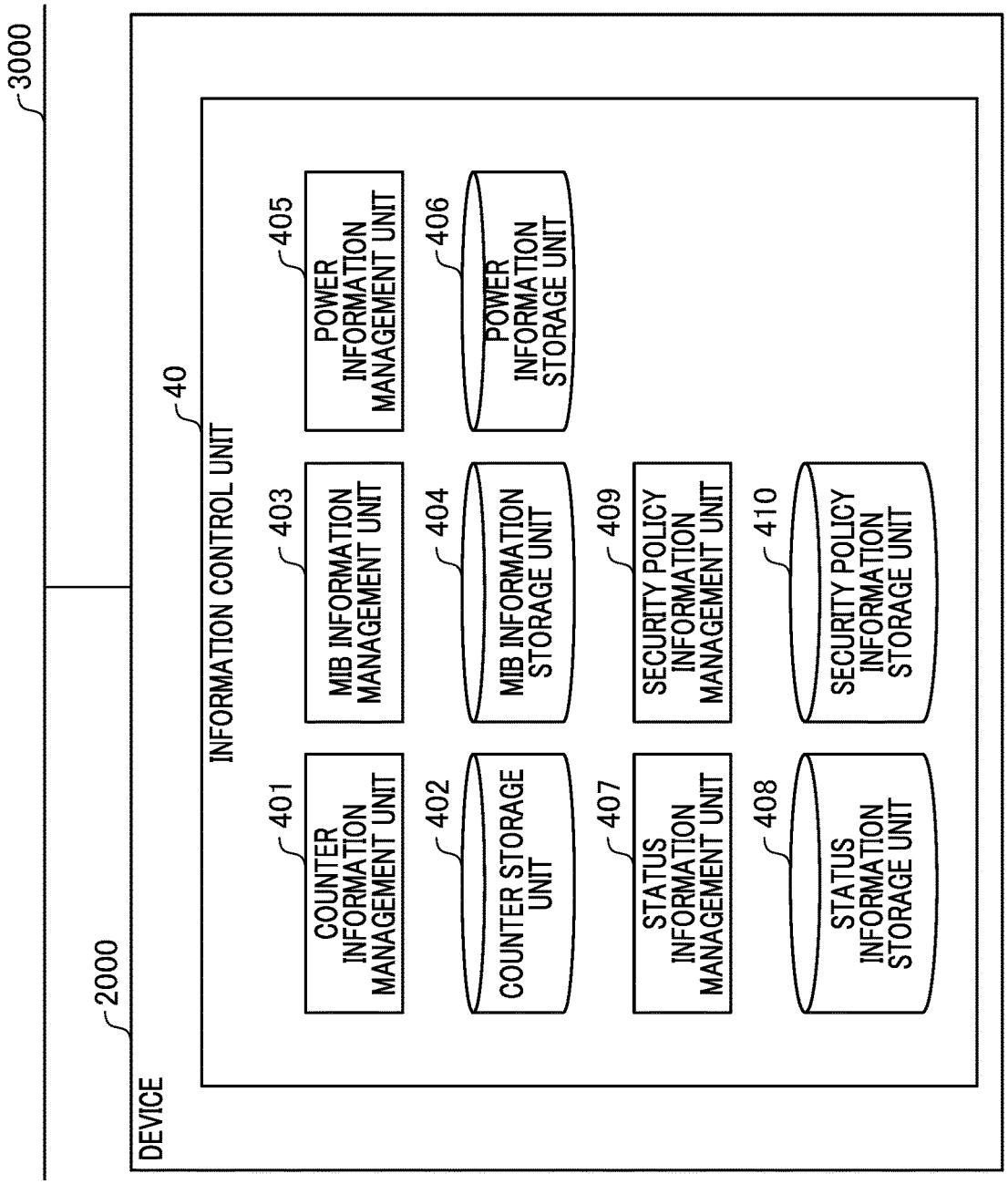
FIG. 4 illustrates a software configuration of a device.

FIG. 4 illustrates a software configuration on the device 2000. The device 2000 has an information control unit 40. The information control unit 40 has a plurality of information management units for managing a plurality of dynamically changing information groups, and a plurality of information storage units for storing information managed by the management units. As a plurality of information management units, the information control unit 40 has a counter information management unit 401, a MIB information management unit 403, a power source information management unit 405, a status information management unit 407, and a security policy information management unit 409. Additionally, the information control unit 40 serving as information storage units corresponding to the respective information management units has a counter storage unit 402, a MIB information storage unit 404, a power source information storage unit 406, and a security policy information storage unit 410.

The counter information management unit 401 manages the number of print pages and the like and stores them in the counter storage unit 402. The MIB information management unit 403 manages MIB information that is device information and stores it in the MIB information storage unit 404. The power source information management unit 405 manages power off information and reboot information and stores them in the power source information storage unit 406. The status information management unit 407 manages status information such as online, offline, and error, and stores them in a status information storage unit 408. The security policy information management unit 409 manages security policy information such as a password setting policy and a port restriction and stores them in the security policy information storage unit 410. The information control unit 40 communicates with external devices such as the device management server 1000. The information control unit 40 receives a request from the device management server 1000 and transmits data stored by SNMP or other protocols to the device management server 1000 in response to the received request.

FIG. 5 to FIG. 9 show an example of the UI of the device management server 1000. The flow of creating schedules of status, counter, security policy, and power management will be described with reference to FIG. 5 to FIG. 9. First, a process for searching for a device to be managed from a network will be described. The device management server 1000 performs the device search so that a device is to be managed.

Figure 5:
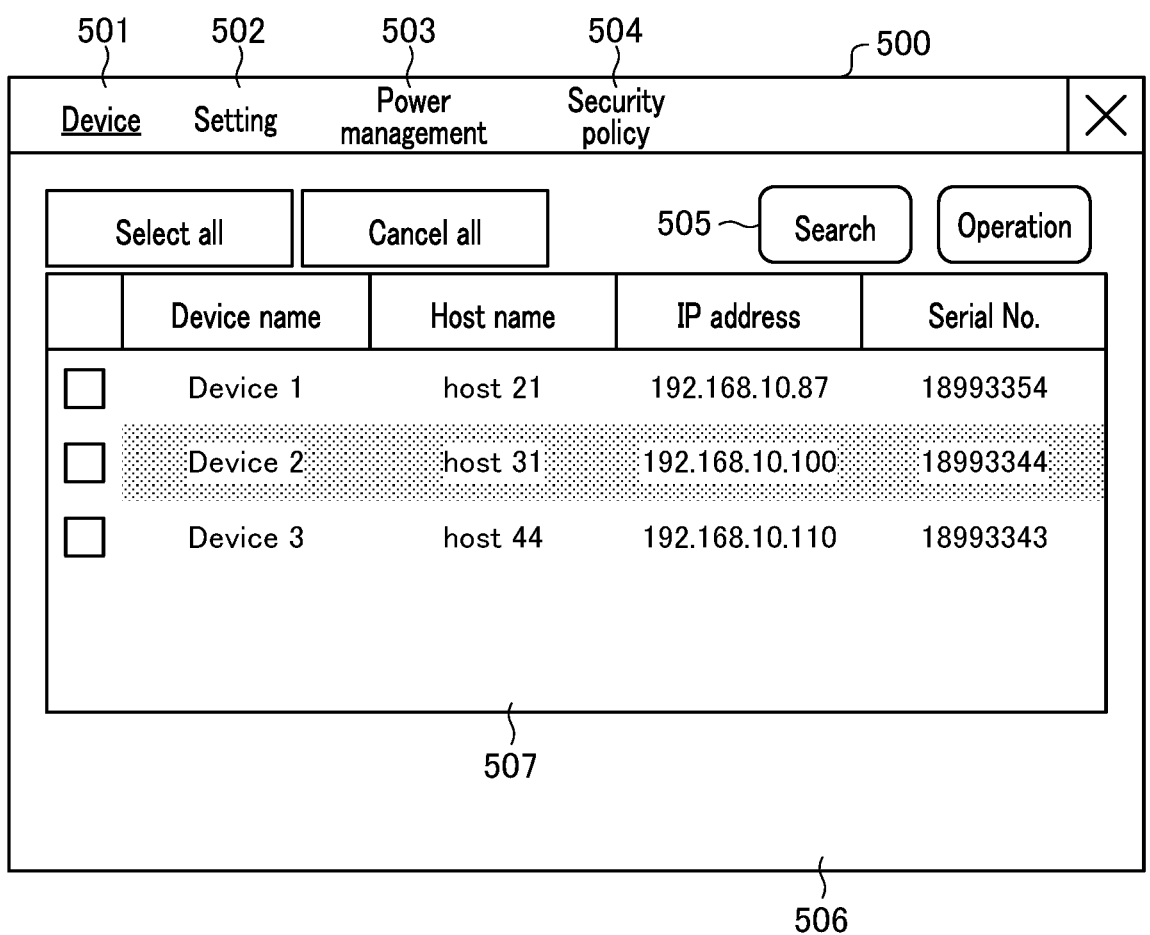
FIG. 5 illustrates an example of a device search screen.
Figure 6:
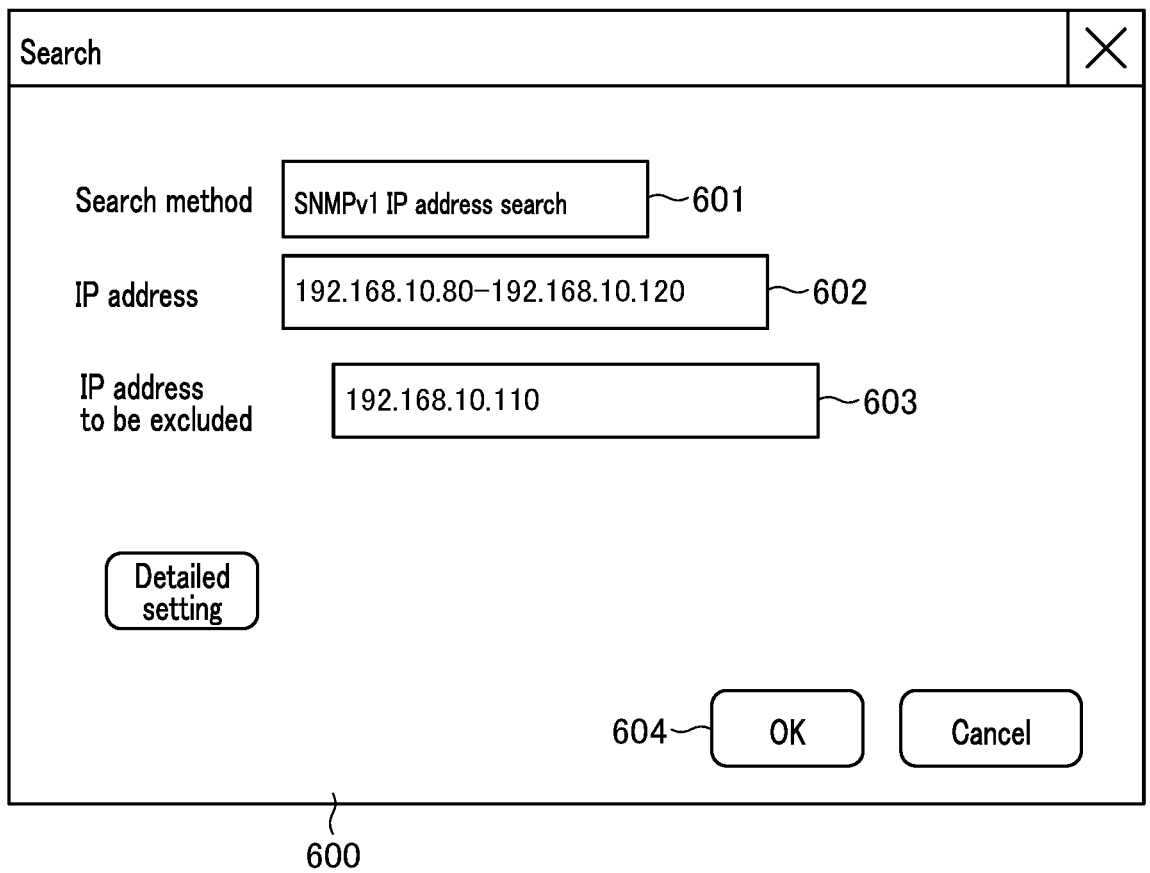
FIG. 6 illustrates an example of a device search setting screen.

FIG. 5 illustrates an example of a device search screen. When a device 501 is selected in the management UI 500 and a search button 505 being displayed is selected, the device management server 1000 displays the search setting screen 600. FIG. 6 shows an example of a device search setting screen. A search method 601, a search range 602, and an exclusion setting 603, which are used as setting items are displayed on the search setting screen 600. The search method 601 is a setting item for specifying a device search method. Although algorithms for device search include, for example, SNMP, their methods are not limited. The search range 602 is a setting item that specifies a range in which a device is searched, for example, an IP address is used to specify the search range. In the example of FIG. 6, "192.168.10.90-192.168.10.120" is specified as the IP address indicating the search range. The exclusion setting 603 is an item for setting a device to be excluded from search, and for example, an IP address of a device to be excluded is set. A device excluded from search is a device excluded from management in the device management server 1000. In the example of FIG. 6, "192.168.10.110" is set as an IP address to be excluded. A range of IP addresses of a device group to be excluded may be specified so that a certain range of devices is excluded. When an OK button 604 is selected, the device management server 1000 searches a device on the network 3000 according to the settings on the search setting screen 600. In the search in the present embodiment, the IP address set in the exclusion setting 603 is excluded from the search target.

An example of the UI after search is shown in FIG. 5. Device information, which is a device list 507, is displayed on a device search screen 506. The device information includes a device name, a host name, an IP address, a serial number, and the like. The device information displayed in the device list 507 includes the device information of the device acquired by the current search and the device information acquired by the previous search and stored in the device information storage unit 313. Therefore, if the device has been searched in the past search and the device information exists in the device information storage section 313, the device having an IP address that is excluded from the search target by the exclusion setting 603 in the search at this time is also displayed in the device list 507. In the examples of FIG. 5 and FIG. 6, although "192.168.10.110" is excluded from the search target, Device 3 corresponding to this IP address is displayed in the device list 507. In the present embodiment, a device excluded from the search target, for example, Device 3, is managed as an unmanaged device.

Next, the schedule setting of each function of device management will be described. In the present embodiment, the range of the target device is different in management setting between the general function and the specific function. The general function is, for example, a function for obtaining information from a device. The specific function is, for example, a function related to power management and a function related to security settings.

First, the general function setting will be described. The user selects setting 502 in the management UI 500 and displays the general function setting screen so that the general function is set. In the setting screen of the general function, information that is the subject of information acquisition, a schedule of information acquisition, and a device to be applied are set. In the present embodiment, a device to which the general function, for example, information acquisition, is to be applied is a device to be managed. Therefore, a device that is managed to be excluded from management is excluded from a device to which general function is to be applied. In a device list (not illustrated) displayed when setting a device to which a general function is to be applied, a device excluded from management is not displayed, only a device to be managed is displayed as a selection candidate, and a user selects a device to which a general function is to be applied from among the devices to be managed. The information to be acquired is, for example, information collected by the device such as counter information including the remaining amount of ink and the number of printed sheets, and status information indicating a state, for example, an error of the device.

Figure 7:
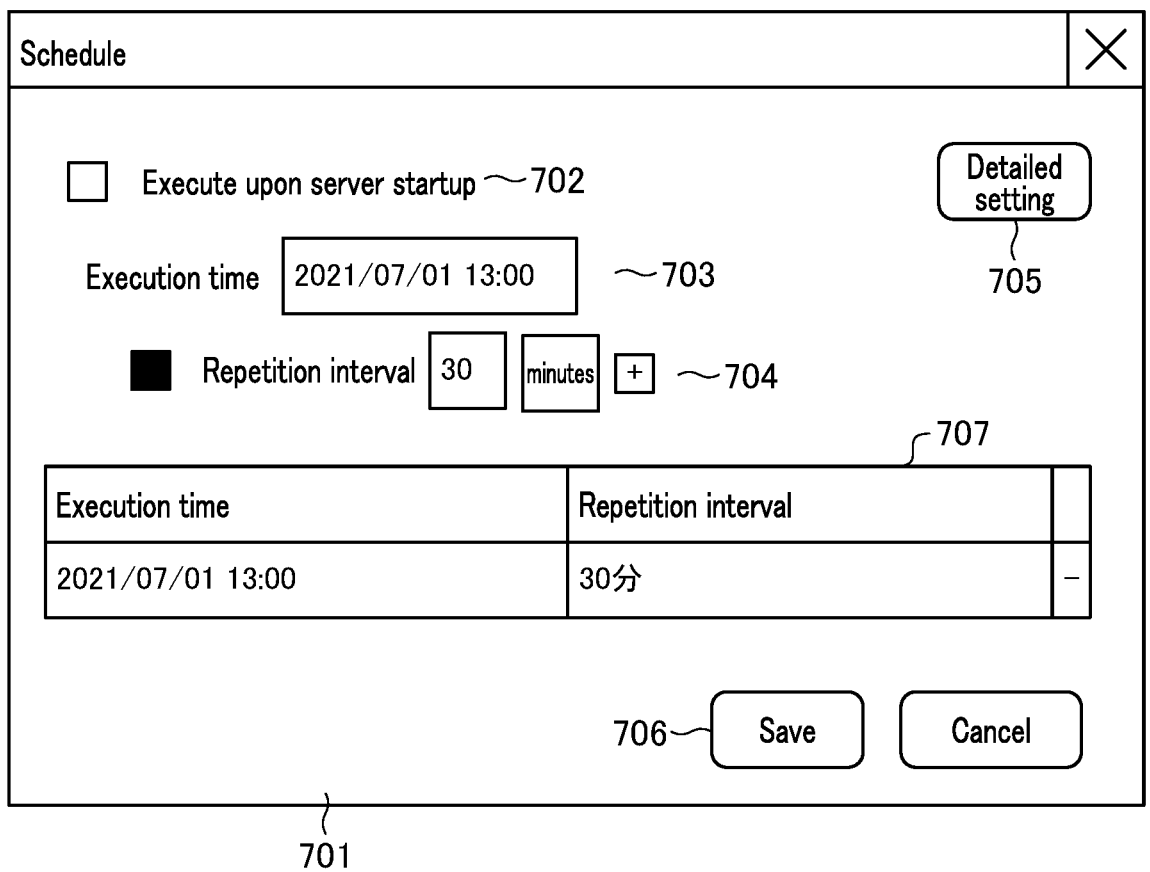
FIG. 7 illustrates an example of a schedule setting screen.

FIG. 7 illustrates an example of a schedule setting screen for the information acquisition function, which is a general function. In a schedule setting screen 701, execution date and time 703 and repetition interval 704 of information acquisition from devices are set. A plurality of schedules can be set and a list 707 of schedules being set at present is displayed at the bottom. In the example shown in FIG. 7, a schedule for acquiring the status every 30 minutes from 13:00 on 2021 Jul. 1 is set. Additionally, setting can be performed such that information from the device is acquired by checking the execution 702 when the server is started upon the start of the device management server 1000. Additionally, if there are any detailed settings specific to the item, the setting can be performed in detailed setting 705. The schedule setting is saved by pressing save 706. Schedules may be deleted or added as appropriate.

Next, the setting related to the specific function will be described. Here, a case in which power supply management 503 is selected as a specific function will be described as an example. Note that the sequence of selecting the applicable devices and setting the schedule is the same when security policy 504 is selected. When the power management 503 is selected, a device selection screen 801 for selecting a device that is a target for power management is displayed. FIG. 8 illustrates an example of a device selection screen. In a device list 802 displayed on the device selection screen 801, selection candidates of devices to be managed regarding the function related to power management are displayed in a list. A user selects a device to which the setting of power management is to be performed from the device list 802. In the present embodiment, the devices to which specific and important functions such as power management are to be applied include a device to be managed and a device managed not to be managed. This is to reduce the probability of a device in which a power source is not managed or a device that causes a security hole. Therefore, in the device list 802, devices to be managed (for example, Device 1 and Device 2) and devices not to be managed (for example, Device 3) are displayed as selection candidates. In the device list 802, for example, a device name, device information, and a check box for selection are displayed. When a device is selected and a next button 803 is selected, a transition is made to a schedule setting screen 901 for setting a schedule of power management.

Note that, on the device selection screen 801, a target display 804 that limits the display based on whether or not the device displayed as a selection candidate is to be managed or not may be displayed. The target display 804 is a pull-down for selecting a target of the device to be displayed in the device list 802, and "all", "management", and "non-management" can be selected. When "all" is selected, devices to be managed and devices not to be managed are displayed as selection candidates in the device list 802. When "management" is selected, devices to be managed are displayed in the device list 802. When "non-management" is selected, devices managed to be excluded from management are displayed in the device list 802.

FIG. 9 illustrates an example of a power management schedule setting screen. On the power management schedule setting screen 90, the setting of schedules such as turning off the power of the device, restarting the device, and the like can be performed. In the operation type 902, the type of power management processing to be executed by the device, such as sleep, sleep cancellation, restart, power off, and the like, can be selected. In the execution start date and time 903, a date and time for executing the processing selected by the operation type is set. In the repetition 904, the interval at which the processing selected by the operation type is repeated can be set. A plurality of schedules can be set. In the example shown in FIG. 9, a schedule for turning off the power of the device from 22:00 on Jul. 1, 2021 to 22:00 every day is set. The schedule setting is saved by pressing save 706.

A schedule related to power management that is currently set is also displayed on the power management schedule setting screen 901. The schedule related to the power management that is currently set is displayed in existing schedule list 906 for each management category (type) of the device specified by the user. Display target type 905 is a pull-down for selecting a management type of a device to be displayed on the existing schedule list 906. In the display target type 905, "all", "management", and "non-management" can be selected. According to the series of settings described with reference to FIG. 5 to FIG. 9, schedules for acquiring various information, power management, and security policy are created for the selected device, and subsequent operations are performed.

Figure 10:
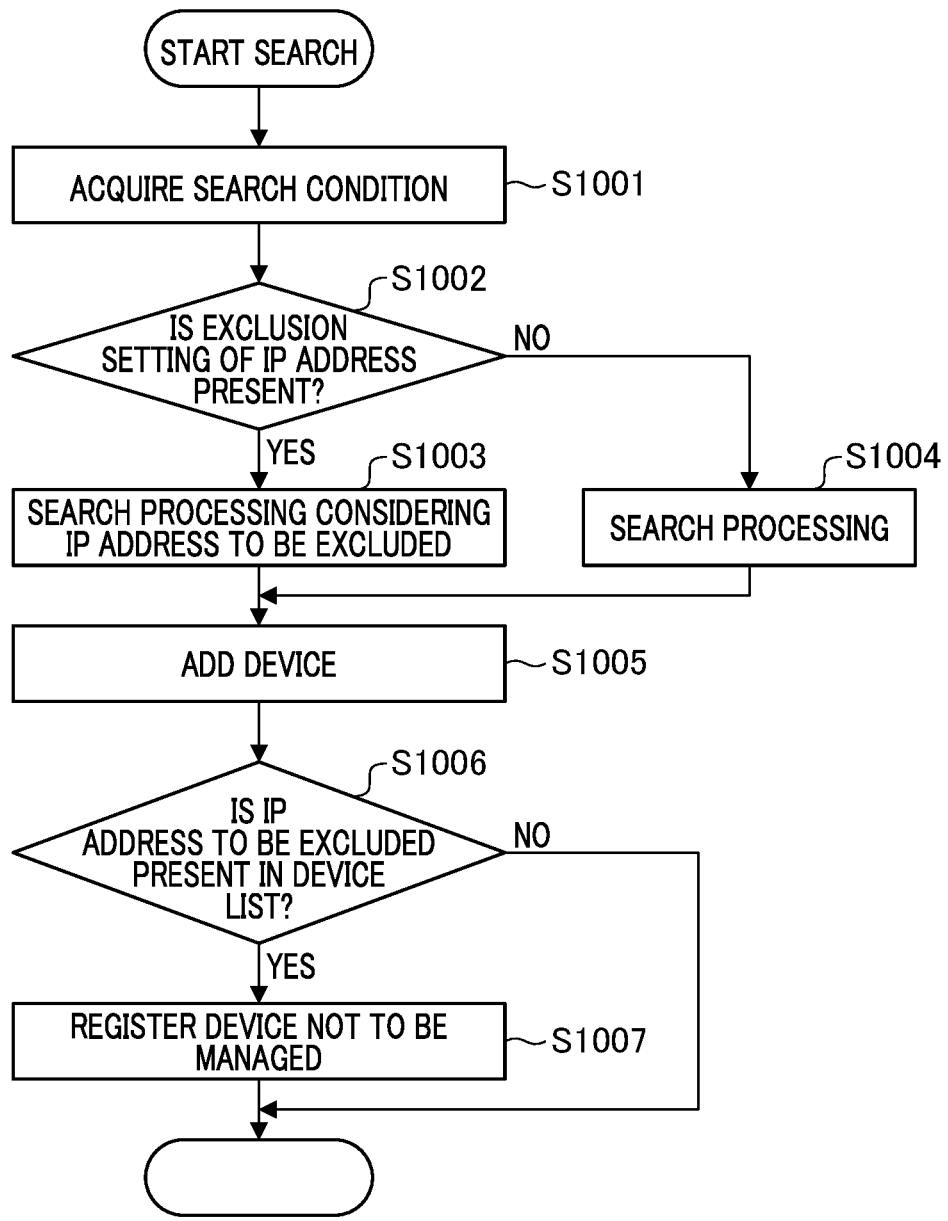
FIG. 10 is a flowchart showing the device search processing.
Figure 11:
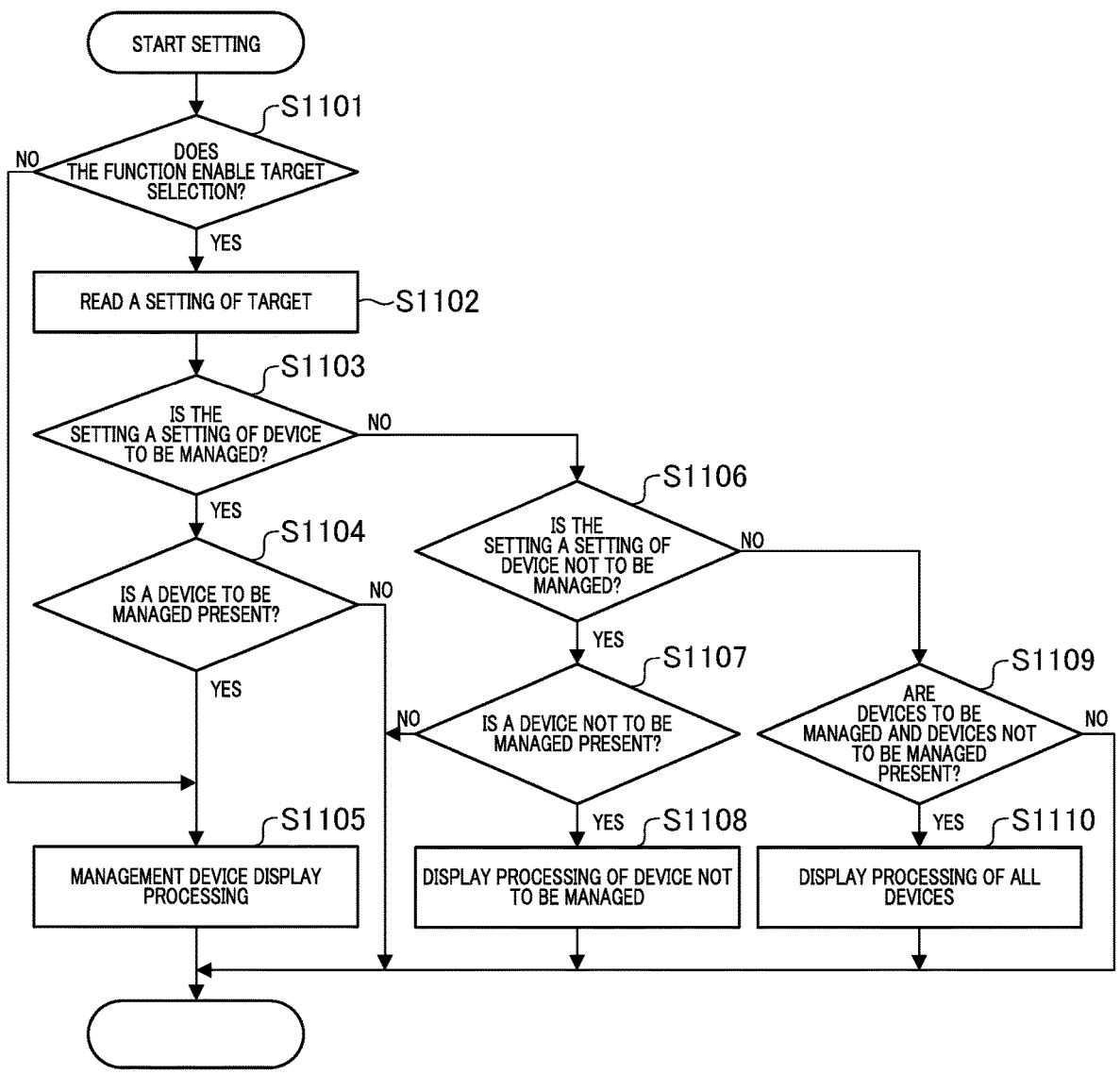
FIG. 11 is a flowchart showing the process of displaying device selection candidates.

The processing of schedule setting in the device management server 1000 will be described with reference to the flowcharts shown in FIG. 10 and FIG. 11. Each of the steps shown in FIG. 10 and FIG. 11 is realized by the CPU 10 of the device management server 1000 loading a device management program from the HDD 19, the ROM 11 or the like into the RAM 12 and executing the program.

First, the device search processing will be described. FIG. 10 is a flowchart showing the device search processing. During device management, the device management server 1000 first searches the device as described above. Device search can be performed each time or performed periodically on a scheduled basis.

In step S1001, the search setting receiving unit 310 receives the setting for searching devices on the network. Specifically, the device search setting input to the search setting screen 600 displayed by the device display unit 301 is acquired. In the setting of device search, for example, a search algorithm, a search range for finding a device to be managed (first designation), information for specifying a device not to be managed (second designation), and the like are acquired. The information for specifying the device not to be managed is, for example, an IP address to be excluded. In the example shown in FIG. 6, the SNMPv1 specified by the search method 601 is acquired as the search algorithm, the search range specified by the search range 602 is acquired as the first designation, and the IP address specified by the exclusion setting 603 is acquired as the second designation.

In step S1002, the device search unit 311 determines whether or not the search setting acquired in step S1001 includes the information for specifying a device not to be managed. That is, whether or not the IP address exclusion setting 603 is present is determined. If the IP address exclusion setting is present, it is determined that information for specifying a device not to be managed is included, and the process proceeds to step S1003. If the IP address exclusion setting is not present, it is determined that information for specifying a device not to be managed is not included, and the process proceeds to step S1004.

In step S1003, the device search unit 311 performs search processing according to the information for specifying a device not to be managed. Specifically, the device search unit 311 performs search processing in which the IP address set to be excluded (second specification) is excluded in the search range specified in step S1001 (first specification). That is, the device search unit 311 does not search the IP address to which the exclusion setting has been specified. In the example shown in FIG. 6, the device search is executed within a range excluding the IP address, "192.168.10.110" from among the search range "192.168.10.90-192.168.10.120" specified by the IP address. In step S1004, the device search unit 311 performs normal search processing in the search range (first designation) specified in step 1001. The device search unit 311 searches for a device in the search range specified in step S1001.

In step S1005, the device information management unit 312 stores the device information newly acquired by the search processing in the device information storage unit 313. Specifically, the device search unit 311 adds the device information to the device list managed by the device information storage unit 313 based on the search result of the search processing in S1003 or S1004. The device information includes a device name, a host name, an IP address, a serial number, and the like.

In step S1006, the device information management unit 312 determines whether or not a device not to be managed, in other words, a device specified to be excluded from device search, is present in the device list. Specifically, the device information management unit 312 determines whether or not the device corresponding to the IP address set to be excluded in the exclusion setting 603 of the search setting screen 600 is present in the device list. The process in step S1006 is performed because the device specified to be excluded from the current search may exist in the device list as the result of the previous search. In the example shown in FIG. 5, the device corresponding to the IP address "192.168.10.110" specified in the exclusion setting 603, which serves as "Device 3" is listed in the device list. If the device not to be managed is present in the device list, the process proceeds to step S1007. If the device not to be managed is not present in the device list, the process ends.

In step S1007, the device information management unit 312 registers the device not to be managed based on the information for specifying the device not to be managed. The device information management unit 312 stores the device information of the device not to be managed, as the information regarding the device not to be managed in the device information storage unit 313. In the example of FIG. 5, the device information management unit 312 stores the device information of Device 3 having the IP address "192.168.10.110" in the device information storage unit 313 as a device not to be managed and manages it. Then, the device search process ends.

Next, a description will be given of a control of device selection candidates displayed on a setting screen for setting a target device when a function is set. When each schedule is created, the device management server 1000 selects an item of a function to be set (for example, the setting 502, the power management 503, the security policy 504), and the schedule setting starts on a device selection screen (for example, the device selection screen 801). On the device selection screen, selection candidates of devices to which the function is to be applied are displayed, according to the function to be set.

In the present embodiment, devices to which the first function for acquiring information such as status information and counter information from the devices is to be applied are only devices to be managed. In contrast, devices to which a second function is applied, which is important and specific function related to security setting and power management, includes a device specified not to be managed. Specifically, when the first function is set, only a device managed to be managed is selected as the selection candidate, instead of selecting a device corresponding to the device information managed to be excluded from management as the selection candidate. In contrast, when the second function is set, both the device to be managed and the device that is selected not to be managed can be set as the selection candidates. A detailed description will be given of a process in which the device display unit 301 of the UI control unit 30 controls the display of the selection candidate of a device providing this function, according to the function selected as a setting target, with reference to FIG. 11. In the present embodiment, although an example in which the function related to the power management and the function related to the security are set as the specific second function by which a management target can be selected will be described, the function for the second function is not limited thereto.

FIG. 11 is a flowchart showing the display processing of the device selection candidates. In step S1101, the device display unit 301 of the UI control unit 30 determines whether or not the function selected as the setting target is a function in which the device not to be managed can be set as the selection candidate. That is, whether or not the function selected as the setting target is the second function, which is the specific function, is determined. When the function selected as the setting target is the second function, which is the specific function, the function is determined to be a function by which a device not to be managed can be set as the selection candidate, and the process proceeds to S1102. In contrast, when the function selected as the setting target is not the second function that is a specific function, the function is determined to be the function by which a device not to be managed cannot be set to be a selection candidate, and the process proceeds to S1105. That is, when the function is the first function, the process proceeds to S1105.

In S1102 to S1110, the device display unit 301 controls the selection candidates to be displayed in the device list 802 according to the user's selection on the target display 804. In step S1102, the device display unit 301 acquires the target display setting set on the UI of the device selection screen. The target display setting displays the type of the device of the selection candidate, and "all", "management", and "non-management" can be selected. "All" is an option to select both the devices to be managed and the devices not to be managed as the selection candidates. The target display setting is selected by the user on the target display 804 of the device selection screen 801. FIG. 12 illustrates an example of a screen for target display setting. When the pull-down menu of the target display 804 on the device selection screen 801 is selected, target display settings of "all", "management", and "non-management" are displayed. The device display unit 301 acquires the result selected by the user on the target display 804.

In step S1103, the device display unit 301 determines whether or not the target display setting acquired in step S1102 is "management". That is, whether or not the display setting of the device selection candidate selected by the user in the target display 804 is a setting for displaying only the device to be managed is determined. When the target display setting is "management", the process proceeds to S1104. When the target display setting is not "management", the process proceeds to S1106.

In step S1104, the device display unit 301 determines whether or a device to be managed is present. Specifically, the device display unit 301 determines whether or not the device information managed as a management target is stored in the device information storage unit 313. When the device to be managed is present, the process proceeds to S1105. In contrast, if the device to be managed is not present, the device display is not performed, and the process returns to S1102. Note that when the device to be managed is not present, an error notification indicating the absence of devices that becomes a selection candidate may be provided.

In step S1105, the device display unit 301 displays the device to be managed in the device list 802, which shows the selection candidate. The device display unit 301 acquires the device information of the device to be managed stored in a device information storage unit 313 via a device information management unit 312 and displays the device to be managed. After the device to be managed is displayed as a selection candidate in the device list 802, the process returns to S1102.

In step S1106, the device display unit 301 determines whether or not the target display setting acquired in step S1102 is a "device not to be managed". That is, whether or not the display setting of the selection candidate of the device selected by the user in the target display 804 is a setting for displaying only the device not to be managed is determined. When the target display setting is "a device not to be managed", the process proceeds to S1107. In contrast, if the target display setting is not "a device not to be managed", the process proceeds to S1109.

In step S1107, the device display unit 301 determines whether or not a device not to be managed is present. Specifically, the device display unit 301 determines whether or not the device information managed to be an exclusion from management is stored in the device information storage unit 313. When the device not to be managed is present, the process proceeds to S1108. If the device not to be managed is not present, the device display is not performed, and the process returns to S1102. Note that the device not to be managed is not present, an error notification indicating that a device that becomes the selection candidate is not present may be provided.

In step S1108, the device display unit 301 displays the device not to be managed in the device list 802 showing a selection candidate. The device display unit 301 acquires the device information of the device not to be managed stored in the device information storage unit 313 through the device information management unit 312 and displays the device not to be managed. After displaying the device not to be managed as the selection candidate in the device list 802, the process returns to S1102.

Here, an example will be given of the display of the device list 802 in the case in which, when Device 3 not to be managed, having IP address "192.168.10.110" as shown in FIGS. 6 and 5 is present, "not management" is selected in the target display 804, with reference to FIG. 13. In step S1107, the device display unit 301 determines that Device 3 having IP address "192.168.10.110" that is a device not to be managed is present and proceeds to step S1008. Subsequently, the device display unit 301 lists Device 3 that is a device not to be managed as the selection candidate of the device and displays it in the device list 802. FIG. 13 illustrates an example in which the device not to be managed is displayed as the selection candidate. Thus, in selecting the device regarding the power management schedule setting, a control for displaying Device 3 as a device not to be managed is performed, the device not to be managed can be selected as a target for power management.

S1109 is a process when the target display setting acquired in S1102 is neither "management" nor "non-management", that is, the target display setting is "all". In step S1109, the device display unit 301 determines whether or not a device to be managed and a device not to be managed are present so that all devices are displayed. Specifically, the device display unit 301 determines whether or not the device information that is managed to be managed and the device information that is managed not to be managed are stored in the device information storage unit 313. When a device to be managed and a device not to be managed are present, the process proceeds to step S1110. If the device to be managed and the device not to be managed are not present, the device display is not performed, and the process returns to S1102. Note that if a device to be managed is not present, an error notification indicating that a device to be the selection candidate is not present may be provided.

In step S1110, the device display unit 301 displays all devices, that is, the devices to be managed and the devices not to be managed, in the device list 802 showing selection candidates. The device display unit 301 acquires the device information for all devices stored in the device information storage unit 313 via the device information management unit 312 and displays all devices. After all devices are displayed as the selection candidates in the device list 802, the process returns to step S1102. The process in FIG. 11 is repeated until the device is selected from the device list 802 and the next button 803 is selected.

According to the present embodiment, the devices excluded from the search during the search can be managed as devices not to be managed. Basically, the devices not to be managed are not targets for management. However, regarding the specific functions such as the power management and the security management, the devices not to be managed can also be a target for management. Therefore, even in the case in which a specific device is set not to be managed, the management for the specific function can be performed, and a detailed device management function that meets the demand for device administrators can be provided.

Second Embodiment

In the first embodiment, a configuration has been described in which the device information corresponding to the IP address that has been excluded during search is managed to be the device information excluded from management by the device information management unit 312, and the device information is continued to be held by the device information storage unit 313, and the specific function including the power management is applied to the device not to be managed. In the present embodiment, an example in which a device is excluded from a target of specific functions such as the power management and the security policy are excluded from will be described.

If there is a device that needs to be no longer managed by the device management server 1000, the user selects a device not to be managed from, for example, a list of all the device information stored in the device information storage unit 313 and issues an instruction to delete the corresponding device information. The device information management unit 312 that has received the instruction regarding deletion via the UI deletes the specified device information from the device information storage unit 313. Even if there is an execution schedule during the execution of a schedule of specific items such as the power management or the security policy, the device management server 1000 performs a control so as not to operate a device from which the device information has been deleted from the device information storage unit 313. This control will be described with reference to FIG. 14.

Figure 14:
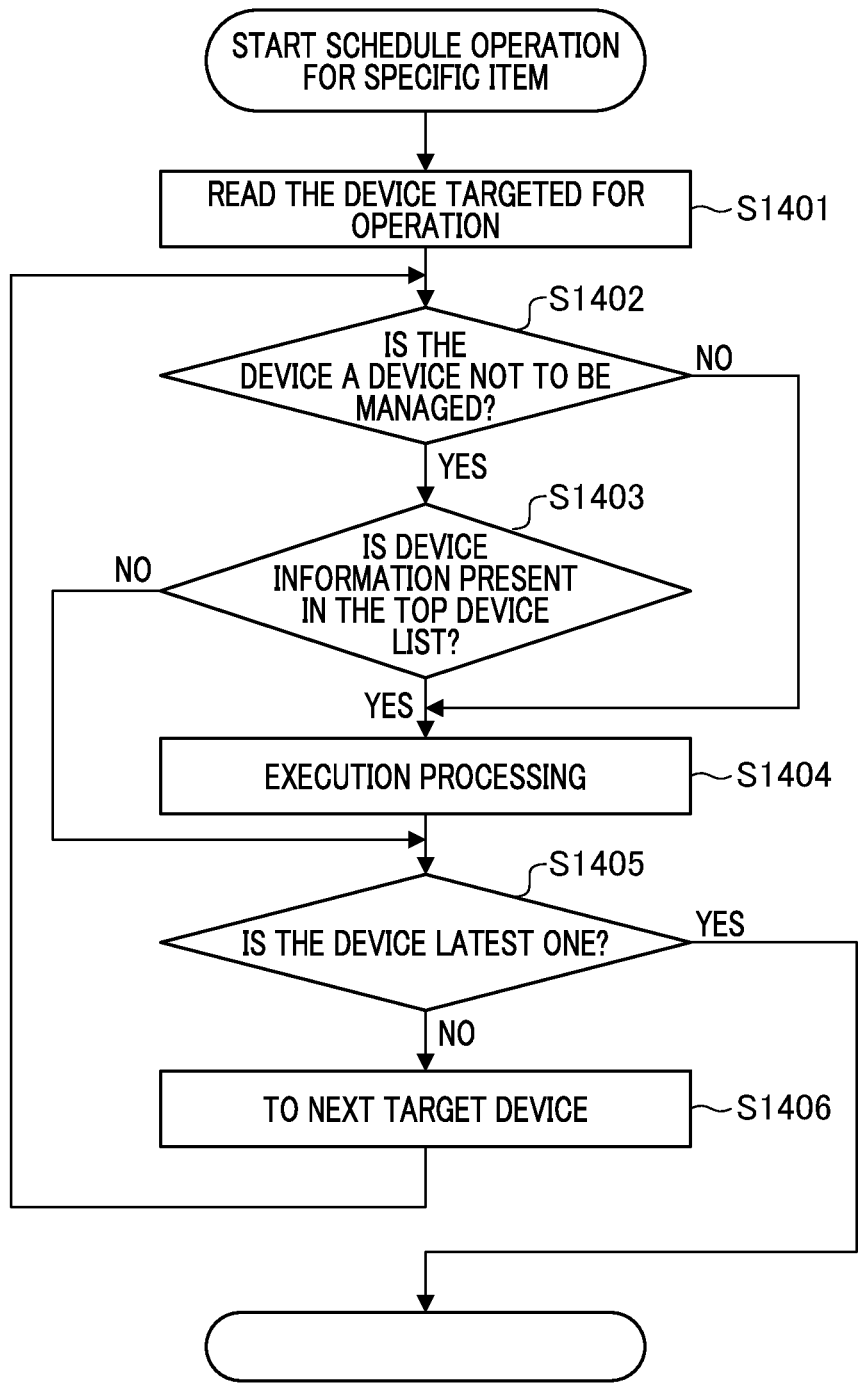
FIG. 14 is a flowchart showing the process during execution of schedule.

FIG. 14 is a flowchart showing the process during the execution of schedule. The process shown in FIG. 14 is realized by the CPU 10 executing device management software. This process starts when the execution schedule set in advance reaches the set time and date and the operation starts.

In S1401, the schedule management unit 321 reads a device to be operated from the schedule storage unit 322 and the process proceeds to S1402. In S1402, the scheduling management unit 321 determines whether or not the device to be operated is a device not to be managed. If there is a plurality of devices to be operated, the determination is performed for each device. If the device is a device not to be managed, the process proceeds to S1403, and if the device is not a device not to be managed, the process proceeds to S1404.

In step S1403, the device information management unit 312 determines whether or not the device information of the device determined to be a device not to be managed in step S1402 exists in the device information storage unit 313. If the device information exists in the device information storage unit 313, the process proceeds to step 1404. If the device information does not exist in the device information storage unit 313, the process proceeds to S1405. In step 1404, the schedule management unit 321 cooperates with each management unit of the function control unit 33 and executes the processing of the function in which the schedule is set to the target device. Subsequently, the process proceeds to S1405.

In step S1405, the schedule management unit 321 determines whether or not the device to be processed is the latest device in the devices to be executed read in step S1401. If the device is the latest device, the process ends. If the device is not the latest device, the process proceeds to S1406. In S1406, the schedule management unit 321 advances the device to be executed read previously to a next target device, and the process returns to S1402.

If the device not to be managed is deleted from the device list during the execution of schedule of specific items such as power management and security policy, the execution processing can be omitted due to these series of operations even if an execution schedule is present for the device. The user can remove all the functions including specific functions such as power management and security policy from the schedule by deleting the device information of the device not to be managed by the device management server 1000 from the device information storage unit 313.

In the present embodiment, although an example in which, when the schedule is executed, a device corresponding to the device information deleted from the device information storage unit 313 is excluded from the target has been described, the present invention is not limited to the time during which the schedule is executed. For example, the device corresponding to the device information that has been deleted from the device information storage unit 313 is also excluded from the selection candidate in the case in which the schedule is set. When the device information corresponding to the device not to be managed is deleted as described above, the device is excluded from the management by the device management server 1000 including power management and security management.

Third Embodiment

It is conceivable in the schedule setting of security policy and power management that the schedule being currently set can be displayed. In the present embodiment, a description will be given of a configuration in which a schedule that is currently set is displayed in the existing schedule list 906 on the schedule setting screen 901 according to a display target type that has been selected from among "all", "management", and "non-management". The control of the display processing of the schedule that is currently set will be described with reference to FIG. 15.

Figure 15:
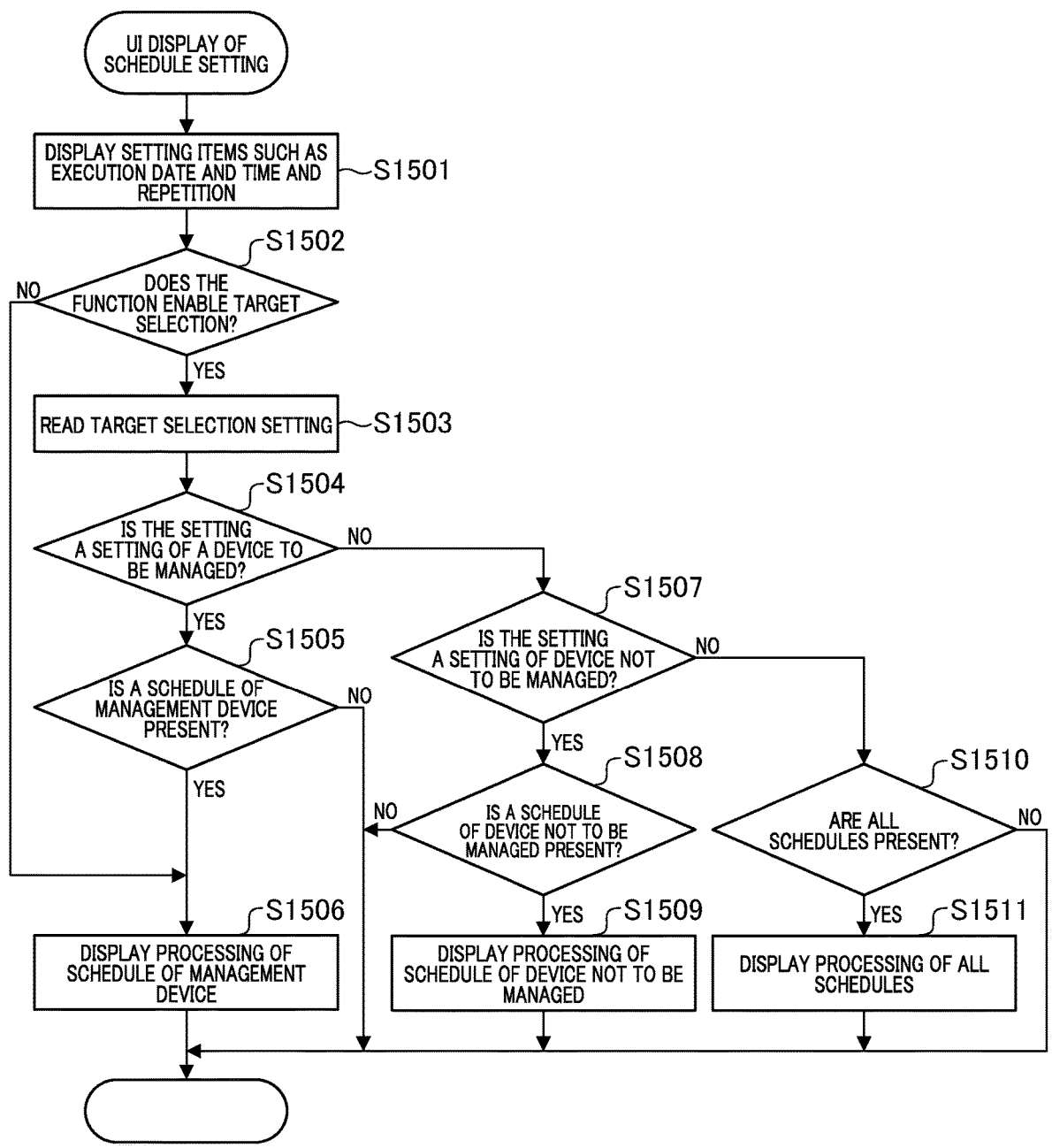
FIG. 15 is a flowchart showing display processing of a schedule setting screen.

In the device management server 1000, when each schedule is created, an item of function to be set in the UI shown in FIG. 5 is selected as described above, and schedule setting starts on each device selection screen shown in FIG. 8. After a device is selected, the schedule setting screen shown in FIG. 9 is displayed. FIG. 15 is a flowchart showing the schedule setting screen display processing. The process shown in FIG. 15 is realized by the CPU 10 executing the device management software.

In S1501, the schedule display unit 302 displays setting items such as execution date and time necessary for schedule setting, repetition setting, and the like. Thus, operation type 902, execution start date and time 903, and repetition 904 shown in FIG. 9 are displayed. In step S1502, the schedule display unit 302 determines whether or not the selected function is a function that enables selecting a device not to be managed. That is, whether or not the function selected as the setting target is the second function that is the specific function is determined. This process is the same as that in step S1101. When the selected function is a function by which a device not to be managed can be selected, the process proceeds to S1503. When the selected function is a function by which a device not to be managed cannot be selected, the process proceeds to S1506.

In step 1503, the schedule setting receiving unit 320 performs processing of reading the device type of the display target set on the schedule setting screen 901. Specifically, the selection of the display target type 905 on the schedule setting screen 901 is read. In the display target type 905, "all", "management", and "non-management" can be selected, and the user selects the device type of the schedule to be displayed.

In step S1504, the schedule display unit 302 determines whether or not the display type selected in the display target type 905 is a device to be managed. If the device type is a device to be managed, the process proceeds to S1505. If the device type is not a device to be managed, the process proceeds to S1507. In step 1505, the schedule display unit 302 determines whether or not a schedule of the management device exists. Specifically, the schedule display unit 302 confirms with the schedule management unit 321 whether or not the schedule of the management device is stored in the schedule storage unit 322. If the schedule of the management device is present, the process proceeds to S1506. If the schedule of the management device is not present, this processing temporarily ends without displaying the schedule and the next user instruction is waited. In step S1506, the schedule display unit 302 performs the schedule display processing of the management device. The schedule display unit 302 displays the schedule of the management device set via the schedule management unit 321 in the existing schedule list 906 based on the data stored in the schedule storage unit 322.

In step 1507, the schedule display unit 302 determines whether or not the display type selected in the display target type 905 is a device not to be managed. If the display type is a device not to be managed, the process proceeds to S1508. If the display type is not a device not to be managed, the process proceeds to S1510. In step S1508, the schedule display unit 302 determines whether or not the schedule of a device not to be managed is present. Specifically, the schedule display unit 302 confirms with the schedule management unit 321 whether or not the schedule of the device not to be managed is stored in the schedule storage unit 322. If the schedule of the device not to be managed is present, the process proceeds to S1509. If the schedule of the device not to be managed is not present, this processing temporarily ends without displaying the schedule and the next user instruction is waited for. In step S1509, the schedule display unit 302 performs the schedule display processing of the device not to be managed. The schedule display unit 302 displays the schedule of the device not to be managed set via the schedule management unit 321 in the existing schedule list 906 based on the data stored in the schedule storage unit 322. In the example shown in FIG. 9, "type: power off", "execution time: 2021/0801 23:00", and "repeat: every day", for Device 3, are displayed as the existing schedule of the devices not to be managed.

In step S1510, the schedule display unit 302 determines whether or not the schedules of the devices to be managed and the devices not to be managed are present in order to display the schedules of all the devices. Specifically, the schedule display unit 302 confirms with the schedule management unit 321 whether or not the schedule of the devices to be managed and the schedule of the devices not to be managed are stored in the schedule storage unit 322. When the schedule is present, the process proceeds to S1511. If the schedule is not present, this processing temporarily ends without performing the schedule display and the next user instruction is waited for. In step S1511, the schedule display unit 302 performs the schedule display processing for all devices including the devices to be managed and the devices not to be managed. The schedule display unit 302 displays the schedules of all devices set via the schedule management unit 321 in the existing schedule list 906 based on the data stored in the schedule storage unit 322.

According to the present embodiment, in the function by which the display of a device not to be managed can be selected, schedules for "all", "management", and "non-management" can be displayed by the user's selection. As a result, it is possible to display the schedule of the device not to be managed that has been already set, and device administrators can recognize and manage the schedule that is currently set.

Other Embodiments

The present invention may be applied to a system comprising a plurality of devices (for example, host computers, interface devices, readers, printers) or to a device comprising one device (for example, copying machines, facsimile machines). The present invention is also achieved by supplying a recording medium on which a program code for realizing the function of the above-described embodiment is recorded to a system or a device, and the computer of the system or the device reading and executing the program code stored in the storage medium. In this case, the program code itself read out from the storage medium realizes the function of the above-described embodiment, and the program code itself and the storage medium storing the program code comprise the present invention.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-157286, filed Sep. 27 2021, which is hereby incorporated by reference wherein in its entirety.

What is claimed is:

1. An information processing apparatus that manages device information of a plurality of devices to be managed in a storage comprising:
at least one memory storing instructions; and
one or more processors configured to execute the instructions, which when executed by the one or more processors, cause the information processing apparatus to:
manage the device information as a management target or as a non-management target in the storage;
display, as selection candidates for selecting a device to which an information-obtaining function is to be applied, a device corresponding to device information managed as a management target, instead of displaying a device corresponding to device information managed as a non-management target to be a selection candidate, wherein the information-obtaining function includes a function for obtaining status information or counter information for the selected device via a network; and
display, as selection candidates for selecting a device to which a specific function different from the information-obtaining function is to be applied, a device corresponding to device information managed as both the management target and the non-management target.

2. The information processing apparatus according to claim 1, wherein the one or more processors further executes an instruction causing the information processing apparatus to:
receive a setting including a first specification for a search range for finding a device to be managed and a second specification for information for specifying a device not to be managed, during settings for searching for a device on the network; and manage the device information as device information that is excluded from management if device information of a device corresponding to the second specification included in the received setting is stored in the storage.

3. The information processing apparatus according to claim 1, wherein the specific function is a function related to security setting for a device through a network or a function related to power management.

4. The information processing apparatus according to claim 1, wherein a device corresponding to device information managed as the non-management target that has been deleted from the storage is excluded from the target of the specific function.

5. The information processing apparatus according to claim 1, wherein the one or more processors can display a schedule of the specific function for a device corresponding to the device information managed as non-management target.

6. The information processing apparatus according to claim 5, wherein an existing schedule of the specific function for a device corresponding to the device information managed as a non-management target is displayed on a setting screen of the schedule of the specific function.

7. A control method of an information processing apparatus that manages device information of a plurality of devices to be managed in storage, the method comprising:
  managing the device information as a management target or as a non-management target in the storage;
  displaying, as selection candidates for selecting a device to which an information-obtaining function is to be applied, a device corresponding to device information managed as a management target, instead of displaying a device corresponding to device information managed as a non-management target to be a selection candidate, wherein the information-obtaining function includes a function for obtaining status information or counter information for the selected device via a network; and
  displaying, as selection candidates for selecting a device to which a specific function different from the information-obtaining function is to be applied, a device corresponding to device information managed as both the management target and the non-management target.

8. A non-transitory recording medium storing a control program of information processing apparatus causing a computer to perform each step of a control method of the information processing apparatus, the method comprising:
  displaying, as selection candidates for selecting a device to which an information-obtaining function is to be applied, a device corresponding to device information managed as a management target, instead of displaying a device corresponding to device information managed as a non-management target to be a selection candidate, wherein the information-obtaining function includes a function for obtaining status information or counter information for the selected device via a network; and
  displaying, as selection candidates for selecting a device to which a specific function different from the information-obtaining function is to be applied, a device corresponding to device information managed as both the management target and the non-management target.

* * * * *